Patented Mar. 17, 1925.

1,529,998

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING ARSENATE OF LEAD.

No Drawing. Application filed April 23, 1924. Serial No. 708,574.

*To all whom it may concern:*

Be it known that I, HENRY HOWARD, a citizen of the United States, residing at Cleveland, in the county of Cuyahoga and State of Ohio, have invented certain new and useful Improvements in Processes of Making Arsenate of Lead, of which the following is a specification.

This invention relates to a process of making arsenate of lead which consists generally in directly combining arsenious oxid ($As_2O_3$) with the higher oxids of lead in the presence of water and a catalytic agent.

Heretofore arsenate of lead has been made by first forming a soluble salt of lead and a soluble salt of arsenic acid and causing them to react in solution or by dissolving lead oxid (PbO) in a solution of arsenic acid. These two processes both involve the preliminary formation of arsenic acid from arsenious oxid, which constitutes the commercial supply of arsenic for the manufacture of lead arsenate. More recently it has been proposed to make arsenate of lead directly from arsenious oxid by several methods, among which may be mentioned the following: (1) Lead oxid (PbO) and arsenious oxid ($As_2O_3$) are mixed together and roasted under oxidizing conditions; (2) red lead ($Pb_3O_4$) and arsenious oxid are roasted together under oxidizing conditions. In this case the excess of oxygen in the red lead over that present in PbO assists the oxidation; (3) lead peroxid ($PbO_2$) and arsenious oxid are roasted together. In this case the oxygen required for converting the arsenious oxid to the arsenic state is furnished by the lead peroxid; (4) arsenious oxid is roasted with lead nitrate.

After a very extensive research in connection with the manufacture of arsenate of lead, I have developed a successful process possessing a number of advantages from the standpoint of commercial operation among which advantages may be mentioned a quick and inexpensive operation, good yield and a product which is very light and voluminous and contains a high percentage of lead arsenate and a very small amount of soluble arsenic.

The process may be applied for the manufacture of the tri-basic arsenate $Pb_3(AsO_4)_2$ by reacting upon the arsenious oxid with a mixture of red lead and lead peroxide in the proportions indicated in the equation:

$$3PbO_2 + Pb_3O_4 + 2As_2O_3 = 2Pb_3(AsO_4)_2$$

or for the manufacture of the di-basic arsenate by the use of lead peroxide alone in accordance with the equation:

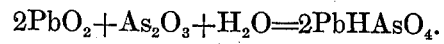
$$2PbO_2 + As_2O_3 + H_2O = 2PbHAsO_4.$$

Since the procedure is substantially identical in both cases the invention will be illustrated hereinafter by reference to the process of making the di-basic arsenate.

One very important feature of my invention resides in the use of an aqueous reaction medium. It is noted in this connection that while in the prior processes an aqueous medium has been employed in combining lead oxid (PbO) and soluble lead salts with arsenic acid and salts thereof, the dry process has been employed exclusively in the manufacture of arsenate of lead directly from arsenious oxid. I have found that for directly combining the higher oxids of lead with arsenious oxid the best results are obtained when an aqueous reaction medium is employed. The reaction may be carried out either in the presence of only sufficient water to form a thick paste or in the presence of sufficient water to form a slurry or suspension. The former method is applicable and may be preferred when working with relatively pure grades of oxids of lead, the latter method being preferred with impure grades. Both methods are applicable with both the pure and the impure grades of the oxids of lead, but the latter method gives a better conversion with the impure oxids than the former. The purity of the arsenious oxid used has no appreciable effect, ordinary commercial giving satisfactory results.

I have also found that the quantity of catalytic agent used has a decided influence upon the success of the process. In this connection it may be stated that the action of the catalytic agent does not appear to be a truly catalytic action as is evidenced by the fact that the use of an amount of the catalyst either more or less than the optimum amount results in a decrease in the conversion and that under such circumstances the conversion cannot be improved by prolonged treatment.

The preferred catalyst is nitric acid and the optimum amount thereof is about 1 to 2% by weight of the combined weights of the oxid or oxids of lead and arsenious oxid in the reaction mixture.

The best results have been obtained by using about 1.4 parts by weight of nitric acid to each 100 parts by weight of lead peroxid. The use of as much as 2 parts and as little as .6 parts by weight of nitric acid to each 100 parts by weight of lead peroxid has shown a decided decrease in conversion.

When using the paste method the reaction is caused to take place by mixing the higher oxid or oxids of lead and arsenious oxid in combining proportions with about 1% of nitric acid and with water in quantity only sufficient to form a paste and heating and stirring the mixture. The reaction takes place very rapidly, being complete in a few seconds after the temperature at which the reaction begins is reached, and a considerable amount of heat is evolved. With some pure grades of lead peroxid the reaction begins at a temperature of about 50° C. while with impure grades it may be necessary to heat up to 90° C. or higher to initiate the reaction. As stated, the reaction takes place very quickly with a spontaneous increase in the temperature of the reaction mixture which varies from about 10° C. for an impure grade of oxid to as high as 50° C. for a pure grade of oxid. During the reaction the mass puffs up and becomes very voluminous. The course of the reaction is indicated by the rise in the temperature of the reaction mixture and by its change in color and physical condition. For quick work, and particularly when working with commercial oxids of lead which are not of high purity, I prefer to carry out the reaction by heating the reaction mixture in an autoclave under steam pressure up to say 40–50 pounds per square inch.

The product of the reaction which is in the form of a white paste may be transferred directly to a drier and then, after being dried, to a pulverizer, or if a pure product is desired, the reaction product may be first washed with water and then dried and pulverized.

The method according to which an aqueous slurry or suspension is used is somewhat slower than the paste method described above, the completion of the reaction requiring several minutes. This method is applicable in the use of either pure or impure oxids of lead, but is preferred in the use of the impure oxids because it gives a considerably better conversion, the pure oxids of lead giving almost perfect conversions by either the paste or the slurry method.

In carrying out the slurry method an example of a preferred procedure is as follows:

100 pounds of lead peroxid, 41 pounds of arsenious oxid, 2 pounds of nitric acid (100%) and 300 pounds of water are mixed and the mixture continuously stirred and heated up to a reaction temperature which varies from about 50° C. in the case of a pure lead peroxid to as high as 90° C. or higher in the case of an impure oxid. After the reaction temperature is reached the reaction is completed in a few minutes, the end of the reaction being indicated by the color of the mixture and by the fact that no further rise in temperature occurs. The lead arsenate product is separated from the resulting slurry by settling or filtration and dried and ground, or first washed and then dried and ground in the usual way.

With pure oxids of lead the product is white or light gray and an analysis thereof shows a conversion as high as 99%. The ratio of $PbO$ to $As_2O_3$ in the product determined by analysis usually runs a little higher than the theoretical ratio, for instance the ratio shown by the analysis may be about 1.97 whereas the theoretical ratio is 1.94 for $PbHAsO_4$. This indicates the probable presence in the product of a small excess of lower oxids of lead. The water soluble arsenic content of a good product is usually in the neighborhood of 0.5% or less.

With some impure oxids of lead the conversion may run as low as 90% and the product may be of a brownish color due apparently to the presence of lower oxids of lead. In all cases, however, the soluble arsenic content is very low, being in the neighborhood of 0.5%.

In the foregoing description oxids of lead running in the neighborhood of 98% or higher are referred to as oxids of high purity, while the references to oxids of lower grade or purity embrace oxids running from say 95% downward.

The slurry method in addition to being better applicable to impure oxids than the paste method, has the further advantage that it gives a more fluffy and voluminous product.

In conclusion it is noted that my wet method of combining arsenious oxid and higher oxids of lead to form arsenate of lead is simple and quick and avoids both the separate oxidation of the arsenious oxid to arsenic acid and the furnacing operations of the prior art, and moreover gives excellent yields of a relatively pure light and voluminous product, a form desirable in the use of the material as an insecticide.

I claim:

1. Process of making arsenate of lead which comprises heating to reacting temperature a mixture containing arsenious oxid, a higher oxid of lead, a catalyst, and water in quantity at least sufficient to form a stiff paste.

2. Process as defined in claim 1 in which the higher oxid of lead is lead peroxid.

3. Process as defined in claim 1 in which the catalyst is nitric acid and the quantity thereof in the mixture is equal to from 1 to 2% of the combined weights of the higher oxid of lead and arsenious oxid.

4. Process as defined in claim 1 in which the quantity of water in the mixture is sufficient to form a slurry with the solid components.

5. Process as defined in claim 1 in which the mixture contains lead peroxid and red lead in the ratio of three molecules of lead peroxid to one molecule of red lead.

6. Process of making arsenate of lead which comprises mixing a higher oxid of lead with arsenious oxid and nitric acid, the latter in quantity equal to about 1.4% of the weight of the oxid of lead, and water in quantity sufficient to produce a slurry, and heating the mixture to a temperature of from 50° C. to 100° C.

In testimony whereof, I affix my signature.

HENRY HOWARD.